Jan. 11, 1966   B. A. JAROSZEWSKI   3,228,253
MAGNETIC MEANS FOR POSITIONING A MOVABLE MEMBER
Filed Sept. 24, 1962   2 Sheets-Sheet 1
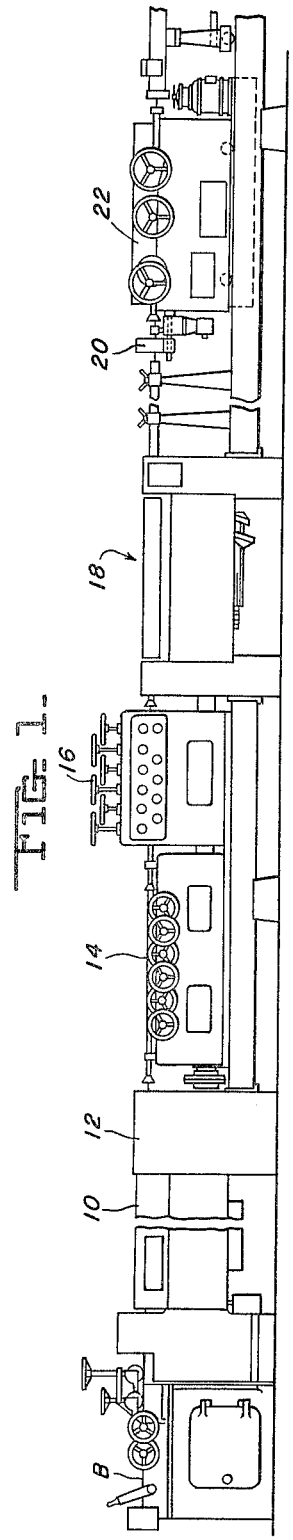
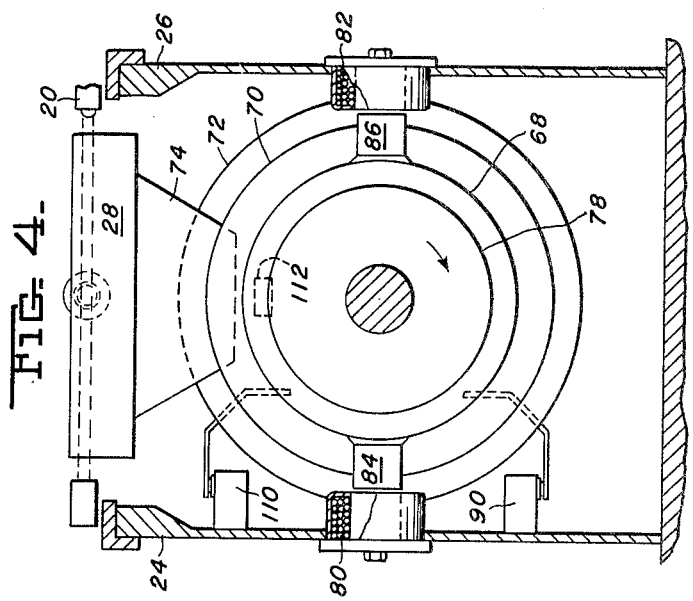
INVENTOR.
BENEDICT A. JAROSZEWSKI
By Donald G. Dalton
Attorney

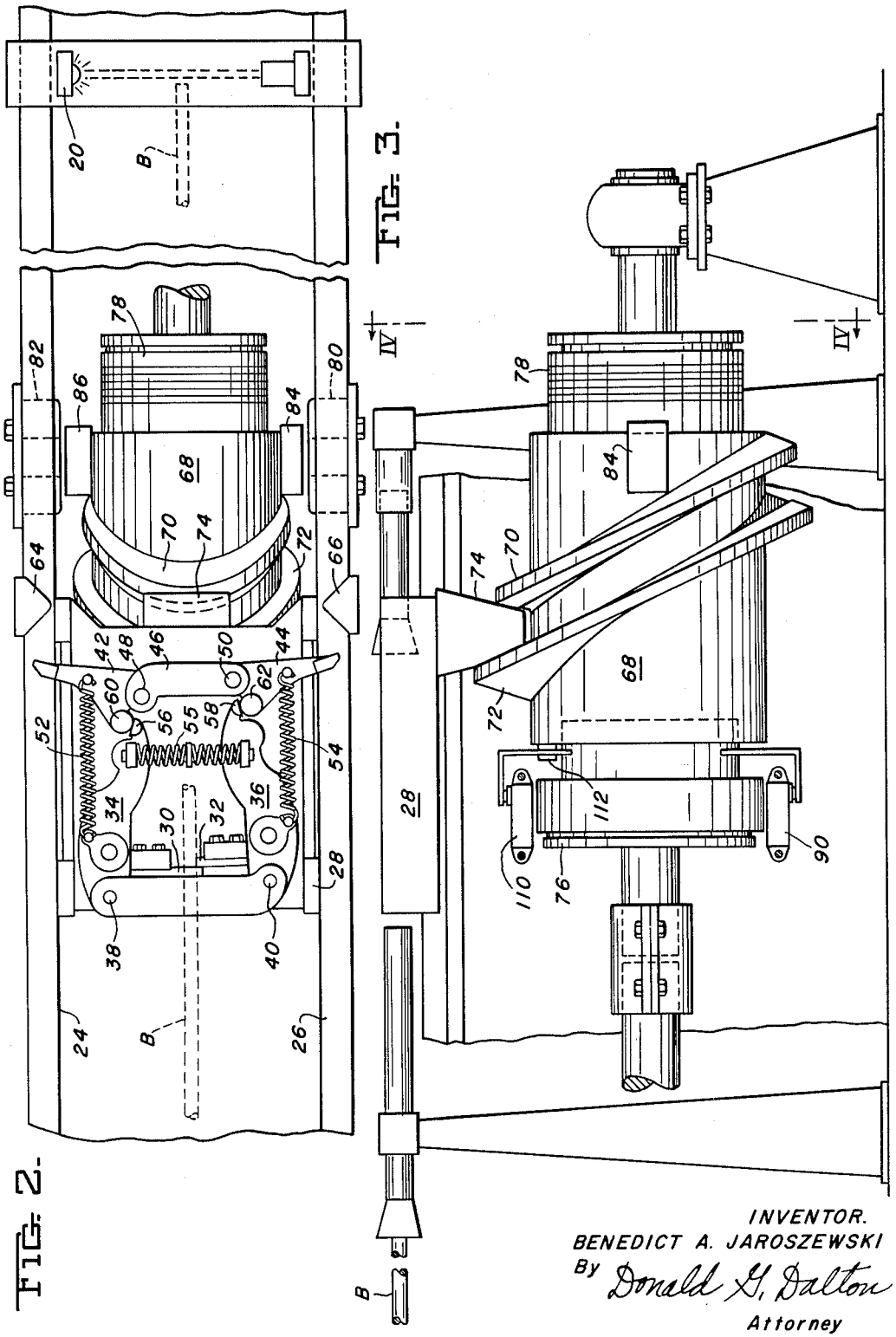

United States Patent Office 3,228,253
Patented Jan. 11, 1966

1

3,228,253
MAGNETIC MEANS FOR POSITIONING A
MOVABLE MEMBER
Benedict A. Jaroszewski, Garfield Heights, Ohio, assignor to United States Steel Corporation, a corporation of New Jersey
Filed Sept. 24, 1962, Ser. No. 225,723
3 Claims. (Cl. 74—1)

This invention relates to magnetic means for accurately positioning movable members, and more particularly to magnetic means for accurately re-positioning a flying shear driven by a rotary cam.

Although this invention is not so limited, it is particularly adapted for use in a bar drawing, straightening, and cutting machine which has a flying shear driven by a helical cam wherein the shear must be accurately re-positioned for each cut to maintain precise control of bar lengths. In this type of machine a long bar section is continuously fed into the machine, drawn, straightened, and cut to predetermined lengths. When the proper length has passed the shear, the shear is actuated and moves with the speed of the bar and while moving severs the bar. Unless the shear starts from the same position each time the lengths of bar cut will vary.

It is therefore a principal object of this invention to provide a magnetic device which will accurately re-position a moving member.

A more particular object of this invention is the provision of magnetic means which will accurately re-position a rotating shaft.

Still a further more specific object of this invention is the provision of magnetic means for accurately re-positioning a cam driven flying shear for each cut.

Yet another more general object of this invention is the provision of a method of repeatedly re-positioning a movable member.

Other objects and advantages of the invention will become apparent from the following description and accompanying drawings, in which:

FIGURE 1 is an elevational view somewhat schematic of a bar drawing, straightening, and cutting machine incorporating the magnetic positioning means of this invention;

FIGURE 2 is an enlarged plan view of the shear portion of the machine of FIGURE 1 showing the magnetic re-positioning device of this invention;

FIGURE 3 is an elevational view of the device of FIGURE 2;

FIGURE 4 is a sectional view looking substantially in the direction of line IV—IV of FIGURE 3; and Referring now to the drawings and particularly to FIGURE 1 a bar drawing, straightening, and cutting machine is shown. The machine includes a conventional bar feeding section 10 adapted to continuously deliver a section of bar B through a conventional drawing die 12. From the drawing die 12 the bar passes through vertical straightening rolls 14 and horizontal straightening rolls 16. From the straightening rolls 14 and 16 the bar is delivered through a flying shear 18, past photo-electric cell 20 to an exit section 22.

The flying shear 18, shown in detail in FIGURES 2, 3 and 4, includes a pair of stationary side rails 24 and 26 slidably mounting a carriage 28. The shearing mechanism, which is carried by the carriage, includes a pair of mated shear blades 30 and 32 which are normally positioned to allow the bar B to pass therebetween. The shear blades 30 and 32 are attached to a first pair of levers 34 and 36 respectively which levers are mounted on pivot pins 38 and 40. A second pair of levers 42 and 44 are pivotally interconnected by means of a link 46 and a pair of pivot pins 48 and 50. Tension spring 52

2 interconnects levers 34 and 42 and tension spring 54 interconnects levers 36 and 44. A compression spring 55 is interposed between the ends of levers 34 and 36 and normally urges the extreme ends 56 and 58 of the levers 34 and 36 against projecting portions 60 and 62 of levers 42 and 44. A pair of wedge-shaped actuating blocks 64 and 66 are mounted on the side rails 24 and 26 respectively and adapted to actuate the shear blades.

The carriage 28 is driven reciprocally on the side rails 24 and 26 from a cam shaft 68 rotatably supported by bearings (not shown). The cam shaft 68 includes a pair of cam tracks 70 and 72 which co-act with a cam follower 74 depending from the carriage 28. As can best be seen in FIGURES 2 and 3, rotation of the cam shaft 68 in either direction will move the carriage 28 to the right from the position shown in FIGURES 2 and 3. This movement to the right will continue during 180° of rotation of the cam shaft and continued rotation past the 180° will return the carriage 28 to the left until after 360° of rotation the carriage will have returned to the position shown in FIGURES 2 and 3. During the movement of the carriage to the right the extreme ends of the levers 42 and 44 will abut actuating blocks 64 and 66 which will actuate the shear blades 30 and 32, moving them toward each other thereby severing the bar passing between them in a conventional manner. When the end of the bar has been severed it is removed by a set of pull out rolls (not shown) in the exit section 22. The pull out rolls are set at a speed substantially faster than the speed at which the bar is being fed into the device so that the cut length of bar will be quickly removed. Upon return movement of the carriage 28 to the left the ends of the levers 42 and 44 will over-ride the actuating blocks.

The shear is actuated into movement by the end of the bar B passing the photo-electric cell 20, causing engagement of magnetic clutch 76 with the cam shaft. The clutch is connected to a motor (not shown) which will start the cam shaft 68 rotating. After a predetermined amount of time the clutch is disengaged allowing the inertia of the cam shaft to continue its rotation thereby continuing to drive the carriage. After another predetermined amount of time a magnetic brake 78 is applied to the cam shaft which will stop the rotation of the shaft after it has rotated approximately 360°. The foregoing description is directed to a conventional piece of commercial equipment which per se forms no part of this invention.

It is not feasible to precisely control the brake 78 to stop the rotation of the shaft after exactly 360° of rotation. Inherent variables in the machinery cause this position to vary as much as several degrees each time which will cause substantial variation in the position of the carriage. However, it is necessary for the carriage to start from precisely the same position each time in order to accurately maintain the lengths of the cut bars. The device of this invention provides magnetic means which precisely and accurately re-position the cam shaft 68, and thus the carriage 28, after each rotation of the cam shaft. The re-positioning device includes a pair of electromagnets 80 and 82 mounted respectively on the side rails 24 and 26. The electro-magnets are constantly energized from an electrical source (not shown). A pair of ferromagnetic (preferably iron) shoes 84 and 86 are mounted on opposite sides of the cam shaft 68 each one adjacent and in line with one of the electro-magnets 80, 82 when the carriage is in the position shown in FIGURES 2 and 3. After the magnetic brake 78 has stopped the rotation of the shaft in its approximate position as described above with the shoes normally a few degrees out of alignment with the electro-magnets the brake is released thereby leaving the cam shaft freely rotatable. The attraction of the magnets 80 and 82 for the ferro-magnetic shoes 84 and 86 will cause the shaft 68 to rotate until the shoes are aligned with their respective magnets. Hence, anytime the shaft is supported for free rotation with the shoes located within the force field of the magnets, the mutual attraction of the shoes and magnets will cause the shaft to rotate to this precise and accurate position. Thus the carriage will start its movement from the same position for each cut. This will accurately control the length cut. The force of the attraction of the magnets 80 and 82 is selected so that it is sufficiently strong to rotate the shaft 68 when the shoes are in the force fields, but is easily overcome by the driving force of the clutch.

While one embodiment of my invention has been shown and described it will be apparent that other adaptations and modifications may be made without departing from the scope of the following claims.

I claim:

1. In an apparatus having a rotatable shaft and means connecting said shaft to a carriage so as to drive said carriage reciprocally on a stationary frame, and wherein the carriage requires periodic re-positioning at a selected reference position with respect to the frame, said apparatus having means mounting said shaft for unrestricted rotative movement and braking means for said shaft, the improvement for accurately re-positioning said carriage which comprises a magnet carried by said frame, a ferromagnetic shoe carried by said shaft in alignment with said magnet when the carriage is in said reference position, said braking means being adapted to position said shoe within the magnetic attracting range of said magnet, whereby when the shoe is moved into the magnetic attracting range of said magnet the magnet will attract the shoe to rotate the shaft and thereby move the carriage to the reference position.

2. In an apparatus having a rotatable shaft and means connecting said shaft to a carriage so as to drive said carriage reciprocally on a stationary frame, and wherein the carriage requires periodic re-positioning at a selected reference position with respect to the frame, said apparatus having means mounting said shaft for unrestricted rotative movement and braking means for said shaft, the improvement for accurately re-positioning said carriage which comprises a pair of magnets carried by said frame on opposite sides of said shaft, ferromagnetic shoes carried by said shaft each in alignment with one of said magnets when the carriage is in said reference position, said braking means being adapted to position said shoes within the magnetic attracting range of said magnets, whereby when the shoes are moved into the magnetic attracting range of said magnets the magnets will attract the shoes to rotate the shaft and thereby move the carriage to the reference position.

3. The machine of claim 1 wherein the said apparatus is a flying shear driven by a rotary cam.

References Cited by the Examiner

UNITED STATES PATENTS

| | | | |
|---|---|---|---|
| 2,440,916 | 5/1948 | Rusnak et al. | 74—815 X |
| 2,484,854 | 10/1949 | Peters | 83—320 |
| 2,556,846 | 6/1951 | Longacre | 317—245 |
| 2,589,134 | 3/1952 | Pyle | 317—245 |
| 2,697,354 | 12/1954 | Johnson | 74—5.1 |
| 2,932,211 | 4/1960 | Vernhes | 74—365 X |
| 3,008,070 | 11/1961 | Nemeth | 317—171 X |
| 3,067,633 | 12/1962 | Lehman | 74—815 |
| 3,078,751 | 2/1963 | Hill | 83—362 X |

BROUGHTON G. DURHAM, *Primary Examiner.*